June 4, 1963

C. E. FISHER, JR., ET AL 3,092,553

PHARMACEUTICAL PREPARATIONS AND METHOD
AND APPARATUS FOR MAKING SAME

Filed April 11, 1960

INVENTORS
CARL E. FISHER JR. & CHARLES H. WILSON

BY

Barney, Kinselle, Raisch & Choate

ATTORNEYS

United States Patent Office 3,092,553
Patented June 4, 1963

3,092,553
PHARMACEUTICAL PREPARATIONS AND METHOD AND APPARATUS FOR MAKING SAME
Carl E. Fisher, Jr., 945 Coolidge, Clawson, Mich., and Charles H. Wilson, 22813 St. Joan, St. Clair Shores, Mich.
Filed Apr. 11, 1960, Ser. No. 21,524
5 Claims. (Cl. 167—82)

This invention relates to pharmaceutical preparations and particularly to such preparations for oral consumption which are intended to release predetermined amounts of pharmaceutical material to the system immediately or over a sustained predictable period of time.

In order to avoid frequent repetition of dosage and to cause predetermined release of the pharmaceutical agent to the digestive system, it is desirable to have a pharmaceutical preparation which will release the active pharmaceutical material at a sustained rate.

It is common practice to produce dosage forms of pharmaceuticals in the form of particles called pellets. These pellets are intended for oral administration in such a form as to provide multiples of the pellets in a single dosage form, such as, a plurality of pellets being filled into a single capsule, being compressed into a tablet or being suspended into a suitable liquid, such as a syrup.

At the present time such pellets are formed from sugars, starches, waxes and other materials, made into granules of irregular shape by passing these materials through suitable size screens and then coating these granules with a mixture of a bulking agent and active pharmaceutical materials which are then dried to form dry granules. Granules of irregular shape are also formed by mixing the pharmaceutical materials with suitable excipients such as sugars, waxes, starches, wetting the mixing with binders such as acacia solution, syrups or other common binders, passing the wetted mass through a suitable size screen and drying the granules. The dry granules made in any of these ways are then coated with materials to provide pellets having a coating which will dissolve or permit diffusion under the influence of designated digestive processes and thereby release the pharmaceutical for absorption into the system.

Some of such coatings may be of a material which is insoluble or non-reactive in acid, such as is present in the stomach, but which is soluble or reactive in an alkaline medium such as is present in the intestinal area.

Where the coating is a type which will dissolve, the granules may have different thicknesses of coatings or different coating materials and may be combined in a single capsule so that when the capsule is administered and the coatings begin to dissolve in the system, the coatings will progressively dissolve depending on the thickness of the coating, thereby releasing the pharmaceutical over a sustained period of time.

Because of the irregularity of the size and shape of the granules of pharmaceutical material, it is impossible to provide a uniform external coating and as a result, the pharmaceutical will not be released uniformly over the entire surface of the pellets.

Another disadvantage of the use of such coated granules made in such a fashion is that because of the irregular shape of the granules there is a tendency for the granules to agglomerate during the coating process.

It is an object of this invention to make minute spherical beads of droplet size which contain a predetermined amount of pharmaceutical uniformly distributed therein as contrasted to a coated granule and which are substantially spheroidal, rather than irregular, in shape.

It is a further object of the invention to provide such beads which are substantially homogeneous under macroscopic examination.

It is a further object of the invention to provide separate beads which contain normally incompatible pharmaceutical materials combined into a single stable dosage form.

It is a further object of the invention to make such beads which are of a size ranging from 10 to 80 mesh before coating.

It is a further object of the invention to provide a novel method and apparatus for making such beads in large quantities at low cost.

It is a further object of the invention to provide a method and apparatus for making such beads which are of droplet size such that a plurality of them may be combined in a dosage form, further treated and provided in a single capsule to provide sustained release over a prolonged period of time.

The minute size beads containing pharmaceutical and embodying the invention are formed by directing a continuous uninterrupted stream or liquid filament of congealable sol, containing the pharmaceutical material in solution or in uniformly dispersed particles, into a continuously moving stream of immiscible liquid which is preferably moving in a direction transversely relative to the direction of movement of the liquid filament. In practice, the congealable sol is directed preferably downwardly through vertical orifices formed by needles or tubes of the hypodermic type or other similar type of suitable bore into contact with a transversely moving stream of immiscible liquid spaced below the lower ends of the needles. High-speed motion picture studies show that the liquid filaments of congealable sol enter the stream of immiscible liquid and are carried along for a short distance and thereafter break up into short segments which quickly assume a spheroidal shape due to interfacial tension. The filaments are preferably directed through a gaseous medium before contacting the immiscible liquid.

The size of the droplet beads which are formed depends on a plurality of interrelated factors which include the size of the orifices, the velocities of the liquid filaments and the velocity of the stream, the relative direction of movement of the filaments and the stream, the viscosity of the congealable sol, the viscosity of the immiscible liquid, the interfacial tension, the density of the congealable sol, the density of the immiscible liquid, the temperature of the congealable sol and the temperature of the immiscible liquid.

Figure 1:
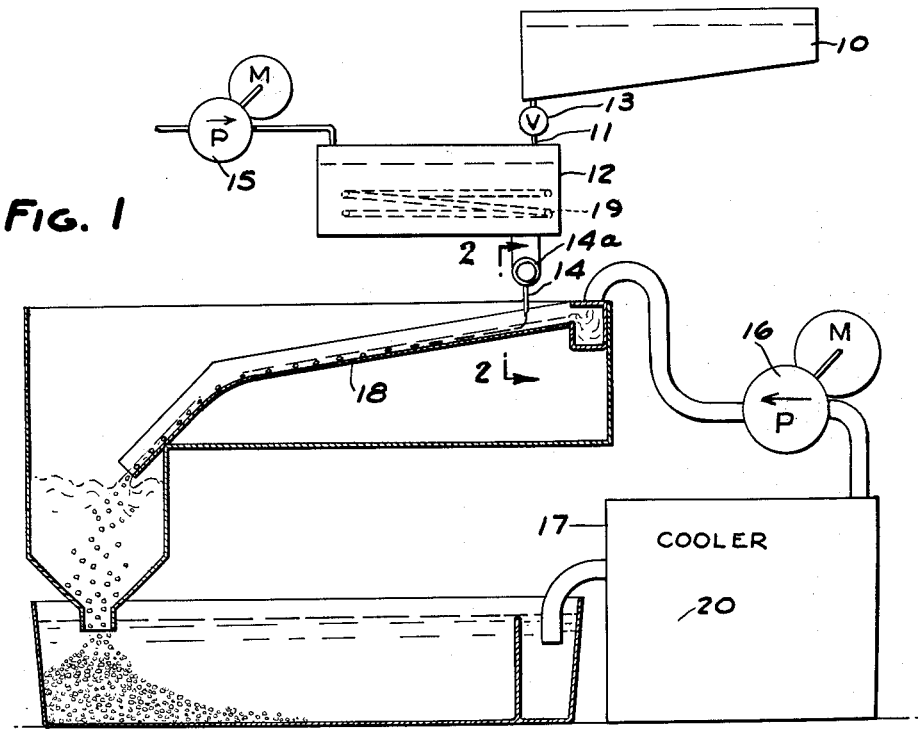
FIG. 1 is a diagrammatic view of an apparatus for performing the method of making the beads embodying the invention.
Figure 3:
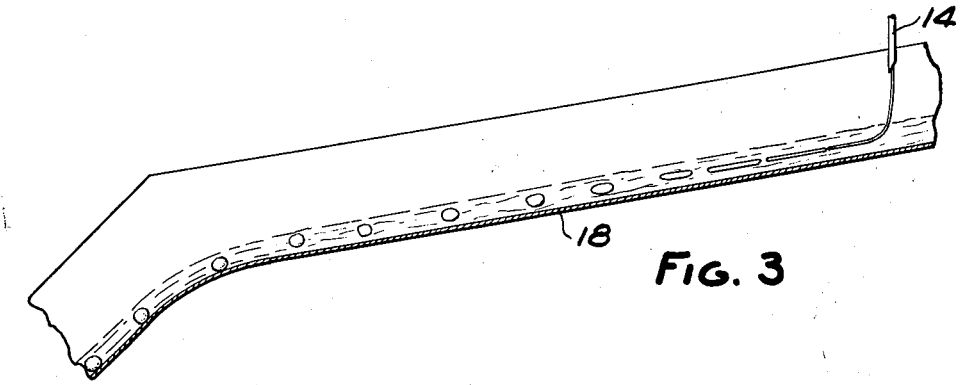
FIG. 3 is a greatly enlarged view of a portion of the apparatus shown in FIG. 1.
Figure 2:
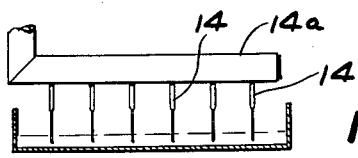
FIG. 2 is a view taken along the line 2—2 in FIG. 1.

Referring to FIGS. 1 to 3, an apparatus for performing the method comprises a reservoir 10 containing a congealable sol and pharmaceutical material. Reservoir 10 is connected by a conduit 11 to a chamber 12. A valve 13 is provided in conduit 11 to control the flow of congealable sol from the reservoir 10 to the chamber 12. Sufficient sol is provided to the chamber 12 either intermittently or continuously in order to form a uniform layer of substantial depth in the chamber 12. A plurality of orifices preferably formed by needles 14 are provided on a pipe 14a in communication with the sol in the bottom of the chamber 12. Air under pressure is supplied to the upper surface of the body of the sol in chamber 12 by a pump 15 under sufficient pressure to force the sol through the orifices 14 in fine continuous uninterrupted streams or liquid filaments. When the pump 15 is operating, sol is directed in a plurality of continuous uninterrupted filaments downwardly through the surrounding atmosphere onto a transversely moving stream of immiscible liquid. As shown in FIG. 1, the stream of immiscible liquid is provided by a pump 16 which removes liquid from a supply reservoir 17 and directs it over a trough 18 in a continuous uninterrupted uniform laminar layer or stream. The stream is of sufficient depth to prevent the beads which are formed from striking the bottom of trough 18. Heating coils 19 submerged in the sol in chamber 12 maintain the chamber at a temperature above the congealing temperature of the congealable sol. Cooling means 20 are provided for maintaining the temperature of the immiscible liquid below the congealing temperature of the congealable sol.

The congealable sol which is used can be a gelatin sol formed of gelatin which is of pharmaceutical grade quality. Zein, polyethylene glycol and other congealable materials may also be used.

The immiscible liquids may be of any type which is immiscible to the congealable sol. For example, in the case of gelatin, the immiscible liquid can be mineral oil, petroleum ether, xylene, toluene, purified benzin, halogenated hydrocarbons such as chloroform, carbon tetrachloride, freons and hydrocarbons such as hexane, heptane and octane or mixtures thereof.

The pharmaceutical materials can be either in liquid or solid form and can be soluble or insoluble in the congealable sol. Water soluble solids or solids which are insoluble in water can be used where the sol contains water. Where the solids are insoluble, they should in no event be so great in size as to obstruct flow of the sol through the needles 14.

When the beads are formed from a water containing sol, after they are formed by the apparatus shown in FIGS. 1 to 3, they are removed and dried in any conventional manner, for example, by air drying, by tumbling in a coating pan, by heat, or by using an absorbent for the water. In any case, the volume of the beads is substantially reduced by the removal of the water. In the case of gelatin, the beads contain as much as 60 percent or more water which is removed so that the volume is reduced. In the case of gelatin, the use of a plasticizer such as glycerin, sorbitol or other suitable material is desired to prevent the beads from wrinkling as they lose water.

The size of the resultant spheroidal beads varies depending upon the plurality of interrelated variables which include the size of the orifices, the velocities of the liquid filaments, the velocity of the stream of immiscible liquid, the relative direction of movement of the congealable sol and stream of immiscible liquid, the viscosity of the congealable sol, the viscosity of the immiscible liquid, the interfacial tension, the density of the congealable sol, the density of the immiscible liquid, the temperature of the congealable sol and the temperature of the immiscible liquid.

The size of the orifices through which the congealable sol containing the pharmaceutical material is forced is such that the minute spheroidal beads that are produced are of sub-drop or droplet size, that is, smaller than can be produced by permitting the sol to drip from the same orifice and smaller than can be produced by applying intermittent pressure to the sol above the same orifice. All other conditions being equal, the smaller the orifice, the smaller the filament and the smaller the resultant spheroidal beads. Satisfactory results have been obtained using needles formed from hypodermic needles of a size ranging from 20 to 23 and preferably not larger than size 18.

The velocity of the stream of immiscible liquid can vary widely but should be greater than the velocity of the filament in the direction of movement of the stream. All other things being equal, the greater the velocity of the immiscible liquid, the smaller the diameter of the spheroidal beads which are formed. All other things being equal, the greater the velocity of the filaments of congealable sol in the direction of movement of the immiscible liquid, the larger the diameter of the spheroidal beads which are formed.

The angle between the direction of the filaments of congealable sol and the direction of the flow of the immiscible liquid may vary over a wide range including acute, right and obtuse angles. In order to avoid problems of possible interference of the jet or resultant spheroidal beads with one another, it is convenient that the angle between the direction of flow of the jets and the direction of the flow of the stream be such that a velocity is imparted to the flow of the congealable sol which has a small vector component in a direction opposite to the direction of flow of the immiscible liquid. This permits the velocity of the immiscible liquid to be at a minimum.

The viscosity of the congealable sol also affects the size of the spheroidal beads. All other conditions being equal, the higher the viscosity of the congealable sol, the larger the diameter of the spheroidal beads.

The interfacial tension between the congealable sol and the immiscible liquid also affects the size of the beads. All other conditions being equal, the higher the interfacial tension, the larger the diameter of the spheroidal beads.

The viscosity of the immiscible liquid also is determinative of the size of the spheroidal beads. All other conditions being equal, the higher the viscosity of the immiscible liquid, the smaller the diameter of the spheroidal beads.

The speed of the immiscible liquid is preferably such that the liquid moves in laminar flow so as to avoid turbulence and minimize the possibility that the beads interfere, agglomerate or coalesce with one another before they have gelled sufficiently.

The density of the congealable sol is preferably greater than the density of the immiscible liquid so that the filament of congealable sol enters into the stream of immiscible liquid and is completely surrounded by immiscible liquid as it flows and subsequently breaks up into the segments that form the spheroidal beads. When the filament is completely surrounded by immiscible liquid a better heat transfer is obtained between the immiscible liquid and the filament. In the case of gelatin, petroleum ether is preferred as the immiscible liquid because of its lesser density.

In order to avoid the possibility of agglomeration or coalescing of the spheroidal beads, it is necessary that the beads gel or congeal as soon after formation as practical. This will eliminate the possibility of the beads coalescing and forming larger spheroids and thereby producing a nonuniformity in the size of the beads. The conditions must be adjusted so that the gelling does not occur until the individual filaments have broken up into segments which have been formed into the spheroidal shape beads. The rate of gelling is a function of a plurality of interrelated variables including the differential between the initial temperature of the congealable sol and its congealing temperature; temperature differential between congealing temperature of the congealable sol and the temperature of the immiscible liquid; degree of contact between the beads and the immiscible liquid; concentration of gelling material in the congealable sol; and type of congealing material in the congealable sol.

All other conditions being equal, the greater the differential between the initial temperature of the congealable sol and the congealing temperature, the longer the congealing time. The greater the differential between the congealing temperature and the initial temperature of the immiscible liquid, the shorter the congealing time. The greater the surface contact between the beads and the immiscible liquid, the shorter the congealing time. The greater the concentration of congealing material, the shorter the congealing time.

In all of the aforementioned variables which affect gelling, the temperature, concentration of pharmaceutical materials, and type of pharmaceutical materials influence the variables and therefore it is essential that in each instance these variables be interrelated in such a manner that the jets of congealable sol contact the stream of immiscible liquid and move with the liquid for a short distance so that they are caused to be broken up in segments which quickly assume a spheroidal shape, and as soon as possible thereafter the spheroidal beads are congealed so that they will not agglomerate or coalesce and will retain their shape and size.

Where the beads are made from a sol which must be dried to remove water or solvent, it is also desirable that a plasticizing effect be provided to prevent the wrinkling of the surface of the droplet size beads which are formed. This may be effected by adding a plasticizer or a plasticizing property may be inherent in the pharmaceutical material that is used.

The invention can be better understood from the following examples:

Example I

| | Parts |
|---|---|
| Pig skin gelatin, bloom 270 | 10 |
| Water, distilled | 34 |
| Benadryl HCl | 4 |
| Glycerin | .6 |

Twenty-five parts of water were added to the gelatin with mixing and the wetted gelatin was allowed to hydrate overnight. Complete hydration insures a more homogeneous gelatin liquid which, in turn, yields more uniform filaments and drops. The hydrated gelatin was heated to 158° F. and nine parts of hot water containing the benadryl HCl was added with stirring. The glycerin was heated to 158° F. and added with stirring. This hot mix had a viscosity of 1300 c.p.s. at 158° F. determined by a Brookfield viscosimeter using a No. 2 spindle at 30 r.p.m. The mix was transformed into spheroids using the apparatus equipped with a linear bank of 20 #22 gauge hypodermic needles using petroleum ether as the immiscible liquid, requiring about 60 minutes' running time. The immiscible liquid was moved across an inclined trough six inches wide at a depth of ⅜ inch and at a rate of 15 gallons per minute. The temperature of the immiscible liquid was maintained at 50° F. The spheroids were separated from the immiscible solvent and dried by conventional techniques to yield 11 kg. of dried beads in the size range #20–30 mesh, or at the rate of about 770,000 beads per needle per hour. The resultant beads were clear, spheroidal and translucent.

Example II

| | Parts |
|---|---|
| Water | 65 |
| Gelatin | 28 |
| Sorbitol (70%) | 5 |
| D-amphetamine sulfate | 2 |

The pharmaceutical material, D-amphetamine sulfate, which is water soluble, was dissolved in water and the plasticizing agent, sorbitol, was blended in with the solution. The solution was then cooled to 50° F. and the gelatin was added with constant stirring. This was left to stand until the gelatin was completely hydrated. The entire mass was then heated to 140° F. until a clear solution was presented. The solution was then directed into a stream of mineral oil as in Example I to form the spheroidal beads.

Example III

| | Parts |
|---|---|
| Gelatin | 31.2 |
| Water | 65.532 |
| Sorbitol (70%) | 5.2 |
| $B_{12}$ (crystalline) | .007 |
| F.D. & C. #3 (erythrosin) | .07 |

The water, sorbitol, and coloring dye, erythrosin, were mixed and brought to a temperature of 50° F. The gelatin was then added and the entire liquid body was left to stand until the gelatin was hydrated. The mixture was then heated to 140° F. until a clear solution resulted. The $B_{12}$ was then added. The gelatin sol containing the pharmaceutical material was then directed into the stream of mineral oil as in Example II.

The resultant beads were homogeneous, spherical, had a substantially uniform diameter and were colored red. In this example, the pharmaceutical material was added just prior to forming the beads because it has a tendency to decompose when subject to elevated temperatures for long periods of time.

Example IV

| | Parts |
|---|---|
| Water | 66.32 |
| Gelatin | 29.00 |
| Sorbitol (70%) | 4.9 |
| Riboflavin | .39 |
| Thiamine hydrochloride | .39 |

The riboflavin which is a solid pharmaceutical material relatively insoluble in water, was mixed with the water and the plasticizing agent, sorbitol. The riboflavin was in the form of colloidal size particles. The mixture was brought to a temperature of 50° F. and the gelatin was added. This mixture was permitted to stand until the gelatin was completely hydrated and then the mixture was heated at 140° F. until a clear solution was produced. The thiamine hydrochloride was then added and the entire mixture was introduced into a stream of mineral oil as in Example II.

The resultant beads were spherical, opaque, had a substantially uniform diameter throughout and were homogeneous in cross-section under macroscopic examination.

Example V

| | Parts |
|---|---|
| Water | 65 |
| Gelatin | 28 |
| Sorbitol (70%) | 5 |
| Sulfaguanadine | 2 |

The pharmaceutical material, sulfaguanadine, in the form of colloidal size particles, which is insoluble in water, was dispersed in water and the plasticizing agent, sorbitol, was blended in with the solution. The solution was then brought to 50° F. and the gelatin was added with constant stirring. This was left to stand until the gelatin was completely hydrated. The entire body was then heated to 140° F. until a clear white dispersion was presented. The dispersion was then introduced into the stream of mineral oil as in Example II. The motion of the immiscible liquid transversely with respect to the streams formed uniform, spherical beads.

Example VI

| | Parts |
|---|---|
| Gelatin | 20 |
| Zein | 8 |
| Sorbitol (70%) | 3 |
| Water | 40 |
| Isopropyl alcohol (91%) | 27 |
| D-amphetamine | 2 |

The zein was dissolved in the isopropyl alcohol. The D-amphetamine was dissolved in the water and mixed with the sorbitol solution. This solution was added to the gelatin with constant stirring and allowed to stand until the gelatin was hydrated. The zein, isopropyl alcohol solution was then mixed with the gelatin and heated. The mixture was then introduced into mineral oil as in Example II.

These droplet size beads made in accordance with the invention may be dispensed by filling capsules, compressing the beads into tablets as discrete beads or suspended in liquids. From the standpoint of sustained release of pharmaceutical materials, the beads are preferably dispensed by filling capsules. Since the pharmaceutical material is dispersed uniformly in the congealable sol, the amount of pharmaceutical in a quantity of beads can be readily determined. Beads of different amounts of pharmaceutical may be placed in the same capsule. Moreover, the beads can be coated with various coating materials and coatings of varying thicknesses and placed in the same capsule to provide a sustained predetermined release over a prolonged period of time. The small uniform size of the beads permits a plurality of beads to be placed in the same capsule with an accurate control of the amount of pharmaceutical which is being dispensed. Since the beads are perfectly spheroidal as contrasted to granular pellets, they can be easily coated with a uniform enteric coating or other desired coating with a better control of the amount of coating which is applied.

Where the beads are to be formed in tablets, they are mixed with a suitable excipient such as lactose and compressed in the tablet machine. For example, the beads may be mixed with lactose and 0.1% magnesium stearate. In addition, the beads may be coated with a film of binder material, such as Carbowax, shellac, starch paste, glucose or acacia, dried and then compressed. Whichever way is used, the beads do not rupture under the pressures used in making the tablets.

It can be appreciated that beads of varying concentrations of pharmaceutical materials may be combined in the same capsule or tablet. In addition, beads containing pharmaceuticals which are normally incompatible may be mixed in the same capsule or tablet.

The beads which are formed are substantially homogeneous and are uniform size and spheroidal shape and contain a predetermined amount of pharmaceutical material. The method and apparatus used permits the beads to be made in large volumes at low cost without waste of pharmaceutical materials.

Although we do not wish to be bound by the theory involved, the following is based upon an analysis of the high-speed movies of our method and is believed to be an explanation of what occurs in the formation of the droplet-size beads. In our process, a filament of congealable sol is flowed into a transverse stream of cooled immiscible liquid. At the point where the filament of sol enters the immiscible liquid, it has zero or negative velocity in the direction of the immiscible liquid and a shear force is exerted on it. This shear force tends to elongate the filament into an even thinner filament. As the filament is carried along by the immiscible liquid, its velocity is increased until it reaches that of the immiscible liquid. At this point, or shortly before it, the shear force exerted on the filament by the immiscible liquid approaches zero and the filament breaks into shorter segments whch then become spheroidal due to interfacial tension. At this stage, the sol has been cooled by the immiscible liquid through a point where the spheroids gel. The flow of immiscible liquid is preferably laminar thereby avoiding turbulence and preventing contact of the beads with one another before they are sufficiently gelled. This eliminates over-size beads which might occur if two or more filaments or if ungelled beads coalesced. In addition, the laminar flow insures that each filament is subjected to the same shear force resulting in a more uniform size distribution in the spheroidal beads that are formed. This liquid filament which is formed is stable as long as the shear force is continued. When the shear force is relieved, the filament breaks up into a multitude of spheroidal droplets each of which is smaller than would be obtained by forming drops directly from the same orifice.

The term "pharmaceutical" as used herein is intended to include drugs, medicines, vitamins and other similar materials taken orally. The words bead, droplet, subdrop and spheroid all are considered synonymous as used herein.

This application is a continuation-in-part of our prior application Serial No. 790,155, filed January 30, 1959, now abandoned.

We claim:
1. The method of treating a vertebrate type animal which comprises administering orally a plurality of droplet size solid, substantially homogeneous spheroidal beads comprising a congealable sol and a pharmacologically active ingredient sufficient to give a pharmacological response upon ingestion and absorption,
   said ingredient being uniformly distributed throughout said sol,
   said droplet beads being made by the steps of directing an immiscible liquid in such a manner as to form a continuous stream,
   directing a congealable sol having said pharmacologically active ingredient distributed uniformly therethrough through a fine orifice of a diameter not greater than the internal diameter of a size 18 hypodermic needle under pressure sufficient to form a fine uninterrupted filament,
   directing the uninterrupted filament into the stream,
   maintaining the temperature of said stream of immiscible liquid below the congealing temperature of said congealable sol,
   controlling the velocities of the stream relative to the filament as they move along in the path of the stream in such a manner as to cause the uninterrupted filament to move uninterruptedly in the direction of movement of the stream along the stream at a velocity sufficient to prevent substantial increase in cross section of the uninterrupted filament and thereafter to cause the filament to break up into elongated segments which quickly contract lengthwise into solid, substantially homogeneous spheroidal beads and thus provide spaces between the individual beads to prevent coalescing as the beads flow in the immiscible stream and thereafter gel.

2. The method of making droplet size solid, substantially homogeneous spheroidal beads containing a pharmacologically active ingredient which comprises directing an immiscible liquid in such a manner as to form a continuous stream,
   directing a congealable sol having said pharmacologically active ingredient distributed uniformly therethrough through a fine orifice of a diameter not greater than the internal diameter of a size 18 hypodermic needle under pressure sufficient to form a fine uninterrupted filament,
   directing the uninterrupted filament into the stream,
   maintaining the temperature of said stream of immiscible liquid below the congealing temperature of said congealable sol,
   controlling the velocities of the stream relative to the filament as they move along in the path of the stream in such a manner as to cause the uninterrupted filament to change in direction as it contacts the stream and to move uninterruptedly in the direction of movement of the stream along the stream at a velocity sufficient to prevent substantial increase in cross section of the uninterrupted filament and thereafter to cause the filament to break up into elongated segments which quickly contract lengthwise into solid, substantially homogeneous beads and thus provide spaces between the individual beads to prevent coalescing as the beads flow in the immiscible stream and thereafter gel.

3. Droplet size beads for oral administration made in accordance with claim 2,
   said beads being solid and substantially uniform in cross section, homogeneous and spheroidal in shape and having said pharmacologically active ingredient uniformly distributed throughout.

4. The method of making droplet size beads containing a pharmacologically active ingredient which comprises directing an immiscible liquid in such a manner as to form a continuous stream,
  directing a congealable sol having said pharmacologically active ingredient distributed uniformly therethrough through a fine orifice of a diameter not greater than the internal diameter of a size 18 hypodermic needle under pressure sufficient to form a fine uninterrupted filament,
  directing the uninterrupted filament through the atmosphere into the stream,
  maintaining the temperature of said stream of immiscible liquid below the congealing temperature of said congealable sol,
  controlling the velocities of the stream relative to the filament as they move along in the path of the stream in such a manner as to cause the uninterrupted filament to change in direction as it contacts the stream and to move uninterruptedly in the direction of movement of the stream along the stream at a velocity sufficient to prevent substantial increase in cross section of the uninterrupted filament and thereafter to cause the filament to break up into elongated segments which quickly contract lengthwise into solid, substantially homogeneous beads and thus provide spaces between the individual beads to prevent coalescing as the beads flow in the immiscible stream and thereafter gel.

5. The method of making droplet size beads containing a pharmacologically active ingredient which comprises directing an immiscible liquid over an inclined trough to form a continuous stream,
  directing a congealable sol having said pharmacologically active ingredient distributed uniformly therethrough through a fine orifice of a diameter not greater than the internal diameter of a size 18 hypodermic needle under pressure sufficient to form a fine uninterrupted filament,
  directing the uninterrupted filament through the atmosphere into the stream,
  maintaining the temperature of said stream of immiscible liquid below the congealing temperature of said congealable sol,
  controlling the velocities of the stream relative to the filament as they move along in the path of the stream in such a manner as to cause the uninterrupted filament to change in direction as it contacts the stream and to move uninterruptedly in the direction of movement of the stream along the stream at a velocity sufficient to prevent substantial increase in cross section of the uninterrupted filament and thereafter to cause the filament to break up into elongated segments which quickly contract lengthwise into solid substantially homogeneous beads and thus provide spaces between the individual beads to prevent coalescing as the beads flow in the immiscible stream and thereafter gel.

References Cited in the file of this patent

UNITED STATES PATENTS

| | | |
|---|---|---|
| Re. 24,899 | Green | Nov. 29, 1960 |
| 1,888,934 | Pitkin | Nov. 22, 1932 |
| 2,183,053 | Taylor | Dec. 12, 1939 |
| 2,218,592 | Taylor | Oct. 22, 1940 |
| 2,340,425 | Pitkin | Feb. 1, 1944 |
| 2,342,661 | Gunnell | Feb. 29, 1944 |
| 2,428,911 | Gunnell | Oct. 14, 1947 |
| 2,436,439 | Lincoln et al. | Feb. 24, 1948 |
| 2,471,358 | Stephenson | May 24, 1949 |
| 2,530,480 | Pitkin | Nov. 21, 1950 |
| 2,556,260 | Downing | June 12, 1951 |
| 2,572,998 | Eisner | Oct. 30, 1951 |
| 2,624,069 | Fisher | Jan. 6, 1953 |
| 2,656,298 | Loewe | Oct. 20, 1953 |
| 2,716,641 | Plas et al. | Aug. 30, 1955 |
| 2,754,289 | Meyer | July 10, 1956 |
| 2,797,201 | Veatch et al. | June 25, 1957 |
| 2,800,457 | Green et al. | July 23, 1957 |
| 2,800,458 | Green et al. | July 23, 1957 |
| 2,841,528 | Myhre | July 1, 1958 |
| 2,851,453 | Kennon et al. | Sept. 9, 1958 |
| 2,899,313 | Makower et al. | Aug. 11, 1959 |
| 2,904,440 | Dimick et al. | Sept. 15, 1959 |
| 2,907,682 | Eichel | Oct. 6, 1959 |
| 2,929,106 | Snow | Mar. 22, 1960 |
| 2,953,454 | Berman | Sept. 20, 1960 |
| 2,953,470 | Green et al. | Sept. 20, 1960 |
| 2,969,330 | Brynko | Jan. 24, 1961 |
| 2,969,331 | Brynko et al. | Jan. 24, 1961 |
| 2,971,916 | Schleicher et al. | Feb. 14, 1961 |
| 2,974,371 | Meakin | Mar. 14, 1961 |

FOREIGN PATENTS

| | | |
|---|---|---|
| 789,844 | Great Britain | Jan. 29, 1958 |
| 795,977 | Great Britain | June 4, 1958 |

OTHER REFERENCES

Termonsen: Arch. Pharm. Chemi, vol. 59 (1952), pp. 311–330.

Bjornsson et al.: "Production of Water-Soluble or Dispersible Pills by the Drop Method," J.A. Ph. A., Sci. Ed., vol. XLV, No. 9, September 1956, pp. 618–623.

Adler: "Das Tropfengewicht als Funktion der Tropfgeschwindigkeit und des Durchmessers der Tropfflache," Physik. Zeitschr. XXXV, pp. 864–867 (1934).

C. Mooers: "Revolution in Liquids," Science News Letter, pp. 250–251, April 19, 1958.